May 10, 1932. F. STEIN 1,857,887

WATER SEPARATOR

Filed Feb. 14, 1931

Inventor:
František Stein,
By
Atty.

Patented May 10, 1932

1,857,887

UNITED STATES PATENT OFFICE

FRANTIŠEK STEIN, OF PRAGUE, CZECHOSLOVAKIA

WATER SEPARATOR

Application filed February 14, 1931, Serial No. 515,786, and in Czechoslovakia January 22, 1929.

My invention relates to water separators and more especially to separators for separating water from compressed air used for the operation of pneumatic tools.

Separators which are used for separating water from steam are so designed as to primarily separate also oil from the steam, but in separators used for separating water from compressed air, it is desirable to so design the separator that a certain amount of oil is retained which being entirely free from water is used as an additional lubricant. This desideratum is realized in the separator of the present invention.

Figure 1:
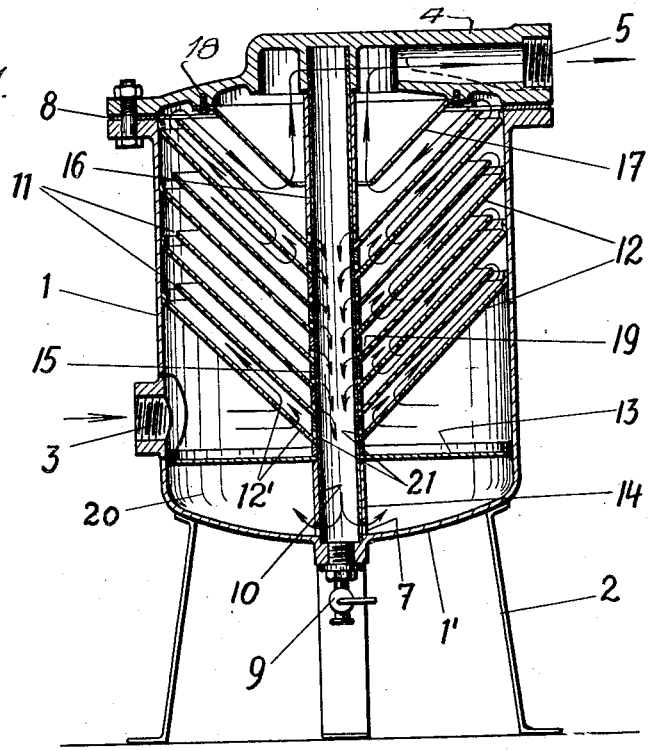
Figure 2:
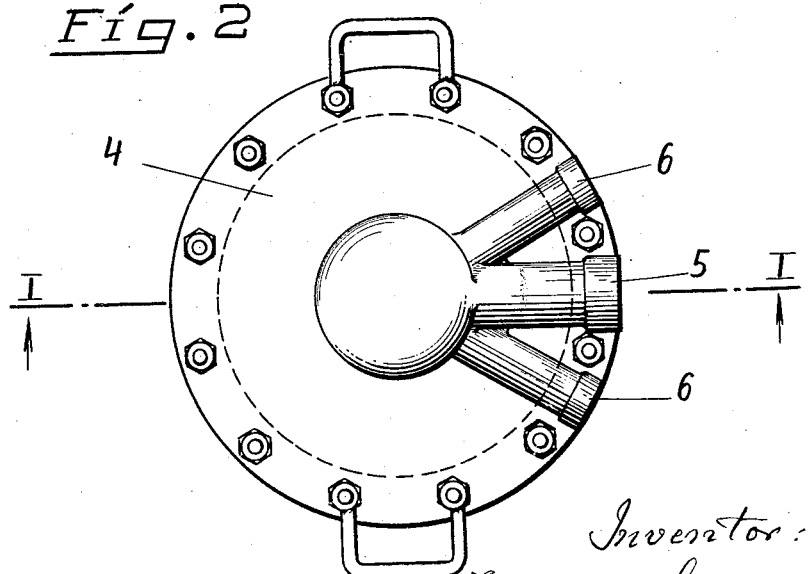

An embodiment of this separator is shown, by way of example, on the appended drawings, on which Fig. 1 is a longitudinal section of the same along line 1—1 in Fig. 2, and Fig. 2 a top plan view.

As shown on the drawings, 1 is a preferably cylindrical closed casing provided with a rounded bottom 1' whereby it rests on feet 2. At the top, the casing 1 is closed by a flanged cover 4, provided with short outlet pipes 5 and 6 for the discharge of air. Between the flange of the cover 4 and the flange projecting from the upper rim of the casing is provided a gasket 8. In the bottom 1' is provided an outlet valve 9. Through the center of the casing passes a tube 10 extending upwardly into the cover 1 and downwardly into the bottom 1'. The lower end of tube 10 is surrounded by a partition 13 of circular shape which bears against the inner wall of the casing forming with its rounded bottom a closed space 20 for the collection of water. The lower end of tube 10 communicates with said space through apertures 7. In one side of the casing wall just above the partition 13 is provided a short air inlet pipe 3. Between the partition 13 and the cover of the casing, conically shaped members 11 and 12 are mounted on the tube 10 with their apices downwardly directed. The inner rims of these conically shaped members are clamped or held in position on tube 10 by spacing collars or pipe-sections 14, 15 and 16. The members marked 12 bear with their outer rims against the inner wall of casing 1 and are provided with apertures 12' whereas the outer rims of the members 11 are separated from the inner wall of casing 1. In those portions of the spacing collars and pipe sections 14, 15 and 16 and tube 10 unaffected by the current of air, apertures 21 are provided for the escape of the separated water. The above mentioned partition 13 with its flanged outer rim is airtightly sealed to the inner wall of the casing and is clamped at its inner rim in position on tube 10 by one of the spacing collars 15. The topmost conical member 17 is secured to the cover 4 by means of screws 18.

The operation of this separator is as follows:

The air entering the closed casing 1 through the short pipe 3 is divided by the apertures 12' of the lowermost conical member into thin streams which in a zig-zag path pass between the conical members 11 and 12 as indicated by the arrows in Fig. 1, all the conical members 12 and the topmost member 17 having apertures 12' for the air currents to pass. As the air currents reach the top of the casing, they escape through the outlet pipes 5 and 6.

Because of the division of the air entering the casing through the pipe 3 and the continual deflection of the various currents of air as they pass through the apertures 12' in the conical members 12 and then around the outer rims of the members 11, the water is separated from the air, and it flows down along the inclined faces of the members into the corners 19 and thence through the apertures 21 into the tube 10, from which it emerges through the holes 7 at its lower end into the collecting chamber 20, to be drained therefrom from time to time by the opening of the outlet valve 9.

The division of the air entering the casing and the continual deflection of the divided air currents compelling their direction of flow to be varied are comparatively gradually effected. The distribution of the apertures 12' in the conical members 12 and the spacing of the same from the conical members 11 are so determined that a complete separation of the water from the air is insured while a certain amount of oil is retained in the air which escapes from the outlet pipes 5 and 6. This oil is advantageously utilized as an additional lubricant for the pneumatic tools to be operated.

The new separator is of sturdy construction and can be readily used in portable systems operating with compressed air. It also is so designed that it can be readily adapted for any desired amount of air. It suffices to either enlarge the air inlet pipe 3 or to restrict its cross-sectional area by suitable linings and correspondingly to increase or decrease the number of conical members and if necessary to vary the spacing thereof.

I claim:

In a separator for separating water from compressed air, the combination with a casing and a lid therefor provided with air outlets, of a tube coaxially disposed in the center of said casing extending through the center of the same and having outlet openings for the escape of the water, and a plurality of inverted conical members mounted on said tube in spaced relation alternately bearing against the inner wall of said casing and separated therefrom so as to form a tortuous path for the air passing through said casing from the bottom to its top, the members bearing against the inner wall of said casing having apertures therein for the passage of the air, the topmost of said members being carried by said lid.

In testimony whereof I affix my signature.

FRANTIŠEK STEIN.